Oct. 7, 1947.  W. SORENSEN  2,428,395

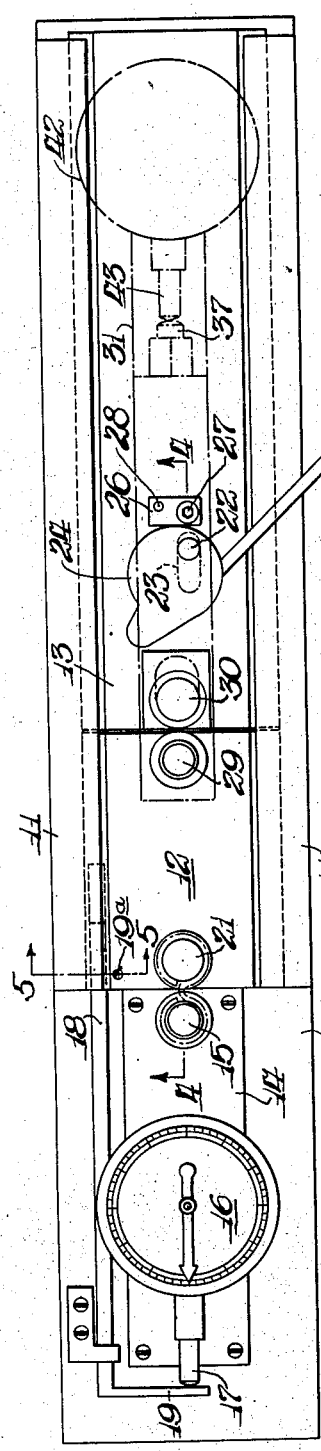

MACHINE FOR TESTING BELT LINKS

Filed July 2, 1945  2 Sheets-Sheet 2

INVENTOR.
Walter Sorensen
BY
J. H. Church & W. E. Thibodeau
ATTYS.

Patented Oct. 7, 1947

2,428,395

UNITED STATES PATENT OFFICE 2,428,395

MACHINE FOR TESTING BELT LINKS

Walter Sorensen, Moline, Ill.

Application July 2, 1945, Serial No. 602,742

8 Claims. (Cl. 73—95)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to a testing machine. More particularly the invention relates to a machine for testing cartridge belt links of either of the types shown in the patents to Moinichen, No. 2,355,992 and to Balleisen, No. 2,317,973, for example.

Metallic cartridge links are usually formed from steel by passage of a steel blank or strip through suitable die mechanism. After formation of the links by the die mechanism, the links are usually subjected to a heating and tempering treatment so that they will have the required strength and elasticity. When the links and cartridges are assembled to form a belt, the spacing between cartridges should be within certain tolerances, so that the cartridges will properly align with the gun barrel when the belt is fed through the gun. Sometimes links may have soft spots in the metal or may not have been properly tempered, or they may have become slightly distorted from handling or shipping. If such faulty links are assembled in a belt, and the belt is subjected to any strain, the faulty links may become distorted or stretched beyond their elastic limit so that they may interfere with proper cartridge alignment and gun firing. It therefore becomes desirable to subject the links to accurate testing before assembly thereof into belts.

The principal object of the present invention is to provide a simple and efficient testing machine that may accurately measure the stretch-resisting characteristics of cartridge belt links.

An important object is to incorporate in the machine means for measuring the force applied to stretch the link and means for measuring the extent of deformation or stretching of the link in relation to the force applied thereto.

It is another important object of the invention to provide a machine that is small and compact and that may be easily carried about for use in different locations.

The invention has for another object the provision of a machine consisting of relatively few moving parts and including means for manual operation thereof so that the machine may be used primarily for the testing of individual links.

The foregoing and other objects of the invention will become apparent from the following detailed description of a preferred embodiment of the invention as illustrated in the accompanying sheets of drawings in which:

Figs. 1, 2 and 3 are respectively plan, side and end views of the machine;

Fig. 5 is a fragmentary transverse sectional view, on an enlarged scale, taken substantially along the line 5—5 of Fig. 1;

Figure 4:
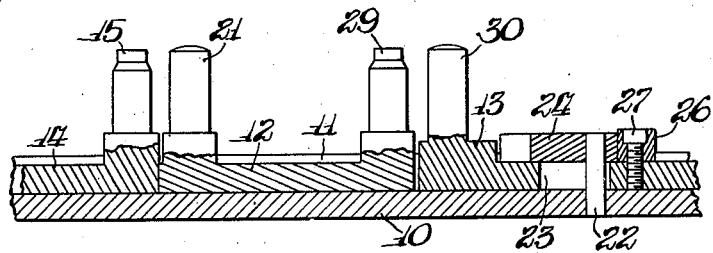
Fig. 4 is a longitudinal sectional view taken on the line 4—4 of Fig. 1.

The preferred form of invention illustrated herein is intended primarily for use in the testing of individual links and for making such tests and measurements as are incident to the development of new types of links and compositions of material from which such links may be constructed.

The machine comprises a longitudinal base 10 formed at opposite sides with a pair of transversely spaced longitudinally running guides 11 which form a longitudinal slideway in which is mounted a first member 12 and a second member 13. These members are thus carried on the base for longitudinal movement with respect to the base and for movement with respect to each other. One end of the base is provided with a suitable supporting element in the form of a block 14 which is rigidly mounted on the base and which carries at one end thereof an upstanding mandrel or pin 15. The block 14 serves also for the mounting thereon of a measuring instrument such as a dial indicator 16 having a longitudinally extending plunger 17. As best shown in Figs. 1 and 5, the movable member 12 has adjustably mounted in a longitudinal bore therein a longitudinally extending rod 18, the free end of which is formed with a transversely extending arm 19 engageable with the plunger 17 of the indicator 16. A setscrew 19a cooperates with a wedge element 20 for securing the rod 18 removably and adjustably in the member 12.

The member 12 carries rigidly thereon at its end adjacent the upstanding pin 15 a link-receiving mandrel or pin 21 arranged closely adjacent and parallel to the pin 15. These pins are arranged and formed to receive the loops of a belt link, such as a link of either of the types referred to above. The pin 21 is adapted to receive the single loop of such link and the pin 15 is adapted to receive the double loop of the link. In the drawings, the link is illustrated diagrammatically in position on the pins 15 and 21.

An intermediate portion of the base 10 below the second movable member 13 is provided with a vertical bore in which is carried a vertical pivot pin 22 which extends upwardly through a longitudinal slot 23 in the member 13 and which has keyed to its upper end a rotatable cam member 24 disposed above the member 13. The cam member 24 is mounted eccentrically with respect to the pivot pin 22 and is provided with an operating handle 25 which has its shank portion rigidly connected to the cam member 24, being preferably threaded or otherwise fitted into a bore in the cam member. The upper surface of the member 13 carries rigidly thereon means forming a driving lug 26 with which the cam member 24 cooperates for moving the member 13 longitudinally of the base 10. In the preferred form of the invention herein illustrated, the driving lug is secured by a bolt 27 and a dowel pin 28 to the member 13. The cam member and operating handle, in conjunction with the driving lug 26, thus form forcible means for moving the member 13 on the base 10.

Figure 6:
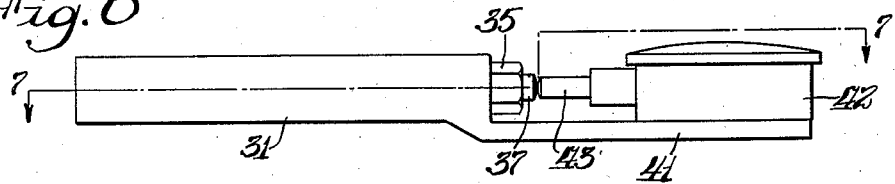
Fig. 6 is a side elevational view of a preferred form of instrument for measuring the force applied to the link.
Figure 7:
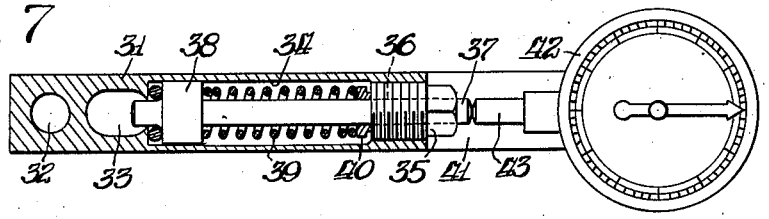
Fig. 7 is a longitudinal sectional view taken on the line 7—7 of Fig. 6.

The member 12 carries rigidly at the end thereof opposite the pin 21 an upstanding pin or mandrel 29. The proximate end of the member 13 carries rigidly thereon a complementary pin or mandrel 30. As best shown in Figs. 6 and 7, the invention includes a measuring instrument adapted for connection between the pins 29 and 30 for the purpose of measuring the force applied by the means 24—26 to move the member 13 with respect to the base 10 and the member 12. The measuring instrument comprises a body portion 31 formed at one end thereof with a vertical bore or opening 32 which serves as means adapting the body portion for connection to the pin 29. The body portion is further formed with a vertical slot 33 spaced from the opening 32 and extending longitudinally of the body portion. A longitudinal bore or recess 34 is formed in the body portion and is threaded at one end to receive a threaded member 35 having a longitudinal bore 36 in which is reciprocably mounted a plunger element 37. The bore 34 is open at its end opposite the threaded element 35 so that the end of the plunger 37 enters the slot 33. The slot is arranged to receive the pin 30 on the member 13 and the plunger 37 is thus adapted to be engaged and moved by the pin 30. The plunger 37 is formed within the bore 34 with a collar 38 against which seats one end of a compression spring 39. The other end of the spring seats against a washer 40 abutting the inner radial face of the threaded element 35. The body portion includes a longitudinal extension 41 on which is mounted a measuring instrument such as a dial indicator 42. The indicator has a longitudinally movable plunger 43 which is normally abutted by the extending end of the plunger element 37. The face of the indicator is preferably graduated to record pounds of pressure; the face of the indicator 16 is graduated in terms of linear measurement.

In the use of the machine for the testing of a belt link as to the stretch-resisting characteristics thereof, a belt link to be tested is mounted upon the pins 15 and 21 in the manner previously described. Appropriate adjustments are made in the rod 18 and arm 19 so that when the latter abuts the plunger 17 of the indicator 16 the pointer on the indicator preferably reads zero. The gaging instrument shown in Figs. 6 and 7 is installed in place on the pins 29 and 30, the bore 32 and slot 33 in the body portion 31 respectively receiving the pins 29 and 30. Necessary adjustments are made by means of the threaded element 35 so that the pointer on the indicator 42 reads zero. It should be understood that the adjustments of the rod 18 and arm 19 and of the threaded element 35 are made only to facilitate the taking of readings on the indicators 16 and 42 by setting the pointers thereof at zero. In the use of the presently disclosed machine, regard is not had to variations in initial distances between the axes of different loops; the important test is that which indicates the stretch characteristics of each link, and it is immaterial that distances between loop axes vary within limits before tension is applied.

By means of the handle 25, the cam member 24 is rotated in a clockwise direction, as viewed in Fig. 1, thus moving the member 13 longitudinally of the base in a manner tending to separate the pins 29 and 30. Pressure applied to the handle 25 and the cam member 24 will be transmitted through the pin 30 to the plunger 37 and thence to the indicator 42. The yieldable connection formed by the compression spring 39 serves as resilient means for connecting the pins 29 and 30 together and consequently provides for movement of the member 12 with the member 13 as additional force is applied to the driving lug 26 by means of the cam member and operating handle. However, the link connected between the pins 15 and 21 will tend to resist movement of the member 12 with the member 13. This resistance will be governed by the stretch-resisting characteristics of the link. Depending upon the particular link connected between the pins 15 and 21 certain tolerances will have been prescribed; that is to say, the permissible stretch of the link should be no greater than a particular amount in relation to a particular amount of force applied by means of the cam member 24. For example, fifty pounds of pressure may be applied to the member 13, which pressure will be transmitted through the pins 29 and 30 and member 12 to the pin 21. Upon the application of this amount of pressure the extent to which the pins 15 and 21 separate should not exceed a prescribed amount, for example .060 inch. Excessive spreading of the pins 15 and 21 will, of course, indicate that the link being tested is subject to excessive stretching and that the use of such link in a cartridge belt would result in spreading of the axes of the cartridges connecting that link to adjacent links. Such deformation of a link in a cartridge belt would result in malfunctioning of the weapon in which the belt was used.

The machine herein set forth is well suited for use in research and engineering involving the development of different types of links and may be used for the purpose of measuring the stretch-resisting characteristics of links without operating on a basis of predetermined or prescribed linear and pressure measurements. In other words, several links may be individually tested on the machine and various recordings taken from the indicators 16 and 42 to indicate the amount of stretching of the link in relation to varying pressure applied thereto.

It will be understood that the foregoing description refers to only a preferred embodiment of the invention and that numerous modifications and alterations may be made in the use, operation and construction thereof without departing from the spirit and scope of the invention as set forth in the appended claims.

I claim:

1. A machine for testing belt links of the type including a pair of cartridge-receiving loops formed about spaced parallel axes, comprising a longitudinal base, means forming a longitudinal slideway in said base, a first member mounted on said base for longitudinal movement with respect thereto in said slideway, a pair of parallel link-receiving pins, one being rigidly mounted on and upstanding from said base and the other being rigidly carried on and upstanding from said first member, said pins being arranged to receive the loops of a belt link of the aforesaid type, a second member mounted on said base for longitudinal movement in said slideway with respect to said base and said first member, a second pair of parallel pins, one being rigidly carried by and upstanding from said first member and the other being rigidly carried by and upstanding from said second member, means for moving said second member on the base including a pivot on said base, a cam member rotatable on said pivot, means on said second member engageable by said cam member upon rotation thereof, means for rotating said cam member, yieldable means connecting said second pair of pins, first gage means associated with said yieldable means for indicating the extent of yielding thereof as movement of said first member is resisted by the belt link connecting said first pair of pins, second gage means on said base, and means connected between said second gage means and said first member for transmitting to said second gage means the extent of relative movement between said first pair of pins as the distance between the axes of the loops of the belt link is increased in response to increased movement of said first member by said second member through said yieldable means.

2. A machine for testing belt links of the type including a pair of cartridge-receiving loops formed about spaced parallel axes, comprising a longitudinal base, a first member mounted on said base for sliding movement longitudinally with respect thereto, a pair of parallel link-receiving pins, one being rigidly mounted on and upstanding from said base and the other being rigidly carried on and upstanding from said first member, said pins being arranged to receive the loops of a belt link of the aforesaid type, a second member mounted on said base for movement longitudinally with respect to said base and said first member, a second pair of parallel pins, one being rigidly carried by and upstanding from said first member and the other being rigidly carried by and upstanding from said second member, means for moving said second member on the base, yieldable means connecting said second pair of pins, first gage means associated with said yieldable means for indicating the extent of yielding thereof as movement of said first member is resisted by the belt link connecting said first pair of pins, second gage means on said base, and means connected between said second gage means and said first member for transmitting to said second gage means the extent of relative movement between the pins of said first pair of pins as the distance between the axes of the loops of the belt link is increased in response to increased movement of said first member by said second member through said yieldable means.

3. A machine for testing belt links of the type including a pair of cartridge-receiving loops formed about spaced parallel axes, comprising a longitudinal base, a first member mounted on said base for movement with respect thereto, a pair of parallel link-receiving pins, one being rigidly mounted on said base and the other being rigidly carried on said first member, said pins being arranged to receive the loops of a belt link of the aforesaid type, a second member mounted on said base for movement with respect to said base and said first member, a second pair of parallel pins, one being rigidly carried by said first member and the other being rigidly carried by said second member, means for moving said second member on the base, yieldable means connecting said second pair of pins, first gage means associated with said yieldable means for indicating the extent of yielding thereof as movement of said first member is resisted by the belt link connecting said first pair of pins, second gage means on said base, and means connected between said second gage means and said first member for transmitting to said second gage means the extent of relative movement between the pins of said first pair of pins as the distance between the axes of the loops of the belt link is increased in response to increased movement of said first member by said second member through said yieldable means.

4. A machine for testing belt links of the type including a pair of cartridge-receiving loops formed about spaced parallel axes, comprising a longitudinal base, a first member mounted on said base for movement with respect thereto, a pair of parallel link-receiving pins, one being rigidly mounted on said base and the other being rigidly carried on said first member, said pins being arranged to receive the loops of a belt link of the aforesaid type, a second member mounted on said base for movement with respect to said base and said first member, a pair of connecting elements, one being rigidly carried by said first member and the other being rigidly carried by said second member, means for moving said second member on the base, yieldable means connecting said connecting elements, first gage means associated with said yieldable means for indicating the extent of yielding thereof as movement of said first member is resisted by the belt link connecting said pins, second gage means on said base, and means connected between said second gage means and said first member for transmitting to said second gage means the extent of relative movement between said pins as the distance between the axes of the loops of the belt link is increased in response to increased movement of said first member by said second member through said yieldable means.

5. A machine for testing belt links of the type including a pair of cartridge-receiving loops formed about spaced parallel axes, comprising a longitudinal base, a first member mounted on said base for sliding movement longitudinally with respect thereto, a pair of parallel link-receiving pins, one being rigidly mounted on and upstanding from said base and the other being rigidly carried on and upstanding from said first member, said pins being arranged to receive the loops of a belt link of the aforesaid type, a second member mounted on said base for movement longitudinally with respect to said base and said first member, a second pair of parallel pins, one being rigidly carried by and upstanding from said first member and the other being rigidly carried by and upstanding from said second member, means for moving said second member on the base, a gage element including a body portion formed with an opening receiving the first-movable-member pin of said second pair of pins, said body portion being further formed with a slot disposed along the path of movement of said second member and receiving the second-movable-member pin of said second pair of pins, a spring-pressed plunger mounted on said body portion and engaging said second-movable-member pin and yieldable upon longitudinal movement of said second member, indicating means connected to said plunger and responsive to movement of said second-movable-member pin in said slot as said second-movable-member pin moves relative to said first-movable-member pin of said first pair because of resistance set up by the link on said first pair of pins, and gage means connected to said first movable member for measuring the extent of relative movement between the pins of said first pair of pins.

6. A machine for testing belt links of the type including a pair of cartridge-receiving loops formed about spaced parallel axes, comprising a longitudinal base, means forming a support at one end of said base and including an upstanding pin rigidly carried by said support and spaced longitudinally from said one end of said base, a measuring instrument carried by said support between said first pin and said one end of said base and including a movable element, a first member carried by said base for movement longitudinally with respect thereto toward and away from said first pin, first and second pins rigidly carried by said first movable member at opposite ends thereof said first pin being disposed adjacent and parallel to the pin on said support, said parallel pins being adapted to receive the loops of a belt link of the aforesaid type, a second member carried by said base toward the end thereof opposite said support for movement longitudinally thereof and toward and away from said first member, a pin rigidly mounted on said second member at the end thereof adjacent the aforesaid second pin on said first movable member, forcible means cooperable between said base and second member for moving the latter away from said first member, said means including a yieldable connection between said second-member pin and said second pin on said first member for connecting said members for movement together away from said support against the resistance of a link on and connecting said parallel pins, gage means disposed adjacent said opposite end of said base and associated with said yieldable connection for measuring force applied by said forcible means, and means including a connecting element on said first movable member and arranged to engage said movable element of said measuring instrument.

7. A machine for testing belt links of the type including a pair of cartridge-receiving loops formed about spaced parallel axes, comprising a longitudinal base, means forming a support on said base and including an upstanding pin rigidly carried by said support, a measuring instrument carried by said support and including a movable element, a first member carried by said base for movement longitudinally with respect thereto toward and away from said first pin, first and second pins rigidly carried by said first movable member, said first pin being disposed adjacent and parallel to said pin on said support, said parallel pins being adapted to receive the loops of a belt link of the aforesaid type, a second member carried by said base for movement longitudinally thereof and toward and away from said first member, a pin rigidly mounted on said second member at the end thereof adjacent said second pin on said first movable member, forcible means cooperable between said base and second member for moving the latter away from said first member, said means including a yieldable connection between said second-member pin and said second pin on said first member for connecting said members for movement together away from said support against the resistance of a link on and connecting said parallel pins, gage means on said base and associated with said yieldable connection for measuring force applied by said forcible means, and means including a connecting element on said first movable member and arranged to engage the movable element of said measuring instrument.

8. A device for measuring the force required to move two elements relative to each other, comprising a body portion formed with an opening for connection to one element, said body portion further including a slot spaced from said opening and extending in the direction of relative movement of the elements, said slot being arranged to receive the other of the elements, a spring-pressed plunger carried by said body portion for movement with respect thereto and having a portion extending into said slot for engagement with and movable by the element in said slot, and a measuring instrument carried by said body portion and having an operative connection with said plunger.

WALTER SORENSEN.

REFERENCES CITED

The following references are of record in the file of this patent:

UNITED STATES PATENTS

| Number | Name | Date |
| --- | --- | --- |
| 169,376 | Scott | Nov. 2, 1875 |
| 673,526 | Moore | May 7, 1901 |
| 1,987,787 | Miller | Jan. 15, 1935 |
| 2,187,914 | Reitan | Jan. 23, 1940 |
| 2,286,286 | Laystrom et al. | June 16, 1942 |